(12) United States Patent
Leong et al.

(10) Patent No.: US 7,016,913 B2
(45) Date of Patent: Mar. 21, 2006

(54) METHOD, SYSTEM, DATA STRUCTURES, AND ARTICLE OF MANUFACTURE FOR IMPLEMENTING A PERSISTENT OBJECT

(75) Inventors: Terence Leong, Benicia, CA (US); Julian S. Taylor, Nederland, CO (US)

(73) Assignee: Sun Microsystems, Inc., Santa Clara, CA (US)

(*) Notice: Subject to any disclaimer, the term of this patent is extended or adjusted under 35 U.S.C. 154(b) by 473 days.

(21) Appl. No.: 10/103,158

(22) Filed: Mar. 20, 2002

(65) Prior Publication Data
US 2003/0182292 A1  Sep. 25, 2003

(51) Int. Cl.
*G06F 17/30* (2006.01)
(52) U.S. Cl. .................................... 707/102; 707/103 R
(58) Field of Classification Search .................... 707/1, 707/2, 3, 4, 5, 6, 7, 8, 9, 10, 100, 101, 102, 707/103, 104.1, 200, 206; 717/111, 116; 719/315
See application file for complete search history.

(56) References Cited

U.S. PATENT DOCUMENTS

| | | | |
|---|---|---|---|
| 6,128,771 A | 10/2000 | Tock et al. ................. | 717/111 |
| 6,223,342 B1 * | 4/2001 | George ...................... | 717/116 |
| 6,505,211 B1 * | 1/2003 | Dessloch et al. ....... | 707/103 Y |
| 6,782,538 B1 * | 8/2004 | Copeland et al. ......... | 719/315 |

FOREIGN PATENT DOCUMENTS

EP         1 030 253         8/2000

OTHER PUBLICATIONS

U.S. Appl. No. 09/844,474, filed on Apr. 27, 2001, entitled, "Method, System, Program, And Computer Readable Medium For Indexing Object Oriented Objects In An Object Oriented Database", invented by Leong et al.

Sun Microsystems, Inc. "Class java.util.Vector" online, 1995-1999, pp. 1-10. [Retrieved on Aug. 22, 2001]. Retrieved from the Internet at URL: <http://java.sun.com/products/jdk/1.1/docs/api/java.util.Vector.html>.

Object Design, Inc. "Class COM.odi.util.OSVector" online, 1998, pp. 1-17. [Retrieved on Mar. 19, 2002]. Retrieved from the Internet at URL: 21 http://www.crs4.it/~tuveri/PSE/doc/apiung/COM.odi.util.OSVector.html>.

Cliff Berg. "How Do I Create Persistent Java Objects" online, Apr. 1997, 1-6. [Retrieved on Aug. 22, 2001]. Retrieved from the Internet at URL: <http://www.ddj.com/documents/s=942/ddj97041/97041.htm>.

Object Design, Inc. "Class COM.odi.Persistent" online, 1996, pp. 1-7. [Retrieved on Mar. 19, 2002]. Retrieved from the Internet at URL: <http://www.crs4.it/~tuveri/PSE/doc/apiug/COM.odi.Persistent.html>.

(Continued)

*Primary Examiner*—Jeffrey Gaffin
*Assistant Examiner*—Yicun Wu
(74) *Attorney, Agent, or Firm*—Lahive & Cockfield, LLP

(57) ABSTRACT

Provided are a method, system, data structures and article of manufacture for implementing an array of persistent elements. A class of the array of persistent elements has a constructor. A call is received from an application executing in a runtime environment to the constructor. The constructor is processed to create an empty array of persistent elements. A persistent element is included into the array of persistent elements within the runtime environment by storing persistent data of the added persistent element in a data record and the address of the data record at a corresponding index record.

32 Claims, 12 Drawing Sheets

OTHER PUBLICATIONS

Arshad, K. M., Y. Atif, and M. Y. Siyal, "A CORBA based Framework for Trusted E-Commerce Transactions", *Proceedings of the Third International Enterprise Distributed Object Computing Conference,* 1999. EDOC '99. Mannheim, Germany Sep. 27-30, 1999, Piscataway, NJ, USA, IEEE, US, Sep. 27, 1999, pp. 18-25.

Chaudhri, A.B. "Nexor Messageware: Object-Oriented Databases and Mission-Critical Directories", Jun. 1998, pp. 1-14.

Comer, D., "The Ubiquitous B-Tree"*Computing Surveys,* vol. 11, No. 2, Jun. 1979, © 1979 ACM, pp. 121-137.

Kim, W., "Research Directions in Object-Oriented Database Systems", 201 1990 ACM. pp. 1-15.

Low, C. C., B. C. Ooi, and H. Lu, "H-trees: A Dynamic Associative Search Index for OODB", *Proceedings of the ACM Sigmod International Conference on Management of Data,* San Diego, Jun. 2-5, 1992, New York, ACM, US, Jun. 2, 1992 pp. 134-143.

Luk, F. H. and A. W. Fu, "Triple-Node Hierarchies for Object-Oriented Database Indexing", Apr. 29, 1998, pp. 1-35.

PCT International Search Report, Jul. 1, 2003, for International Application No. PCT/US02/12905.

PCT Written Opinion, Jul. 9, 2003, for International Application No. PCT/US02/12905.

Ramaswamy, S. and P. C. Kanellakis, "OODB Indexing by Class-Division". *Proceedings of the 1995 ACM SIGMOD International Conference on Management of Data,* 1995, pp. 1-23.

Saljoughy, A., "Object Persistence and Java", [online], May 1997, © 1997 JavaWorld.com. Retrieved from the Internet at <URL: http://www.javaworld.com/javaworld/jw-05-1997/jw-05-persistence_p.html>.

Smith, K. E. and S. B. Zdonik, "Intermedia: A Case Study of the Differences Between Relational and Object-Oriented Database Systems", *OOPSLA '87 Proceedings,* Oct. 4-8, 1987 © 1987 ACM, pp. 452-465.

Sun Microsystems, Inc., "Class Vector: Java™ 2 Platform, Standard Edition", [online] © 1993-1999 Sun Microsystems, Inc., [Retrieved on Apr. 5, 2001]. Retrieved from the Internet at <URL:http://java.sun.com/products/jdk/1.2/docs/api/java/util/Vector.html>.

Traversat, B. and S. Woodward, "Java System Database Server" Version 1.01, May 31, 1998, © 1998 Sun Microsystems, Inc., pp. i-viii, 9-64.

Viara, E., E. Barillot, and G. Vaysseix, "The EyeDB OODBMS", Database Engineering and Applications, 1999. IDEAS '99. Intenational Symposium Proceedings Montreal, Que., Canada Aug. 2-4, 1999, Los Alamitos, CA, USA, IEEE Comput. Soc. US, Aug. 2, 1999, pp. 399-402.

\* cited by examiner

FIG. 1
(PRIOR ART)

400 —
public class Vector
    extends Object implements Cloneable, Serializable ← 414

402 — Selected constructors of the Vector class
Vector()
    Constructs an empty vector.

404 — Selected methods of the Vector Class
elementAt(int)
    Returns the component at the specified index.

406 — addElement(Object)
    Adds the specified component to the end of this vector, increasing its size by one.

408 — removeElementAt(int)
    Deletes the component at the specified index.

410 — setElementAt(Object, int)
    Updates the component at the specified index of this vector to be the specified object.

412 — insertElementAt(Object, int)
    Inserts the specified object as a component in this vector at the specified index.

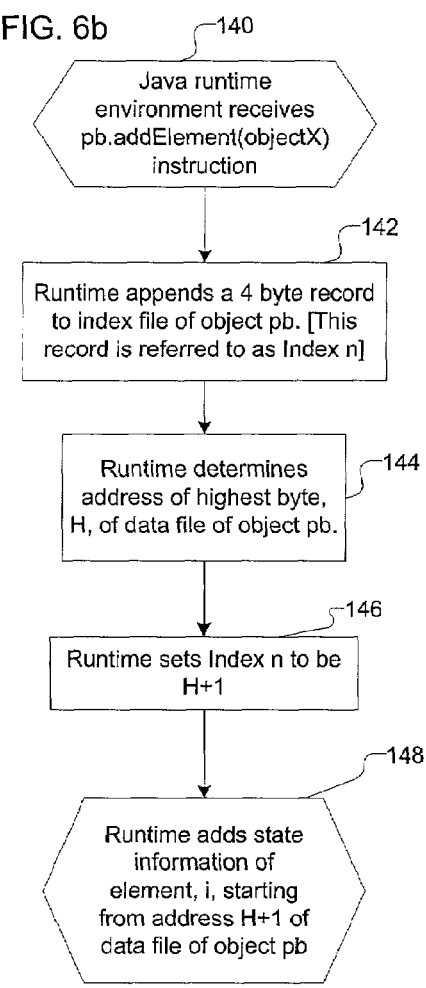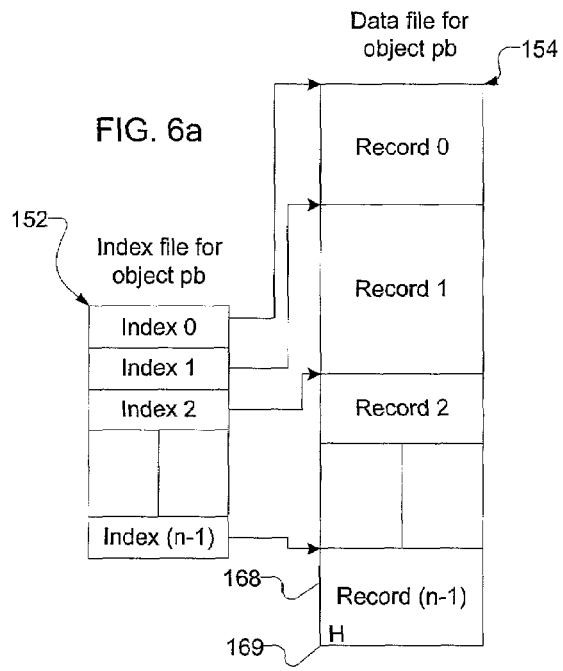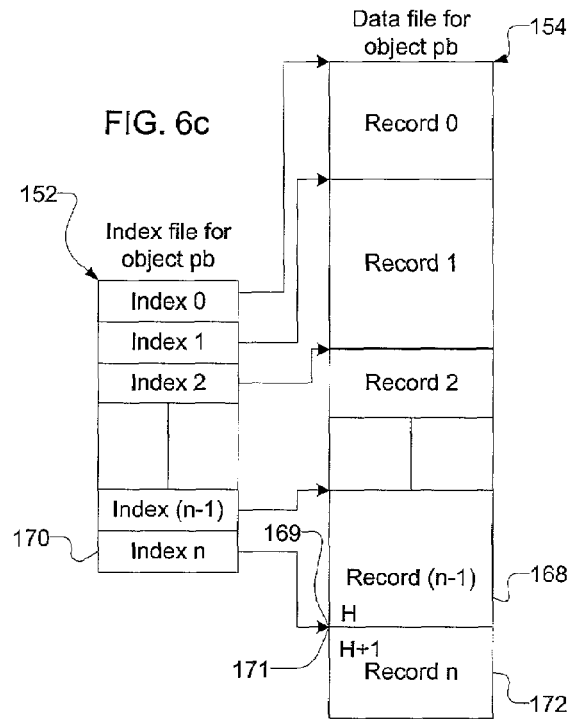

METHOD, SYSTEM, DATA STRUCTURES, AND ARTICLE OF MANUFACTURE FOR IMPLEMENTING A PERSISTENT OBJECT

BACKGROUND OF THE INVENTION

1. Field of the Invention

The present invention relates to a method, system, data structures, and article of manufacture for implementing a persistent object.

2. Description of the Related Art

An object is an entity with a set of possible states. The state of an object comprises the values of the attributes defined for the object. An application can apply methods to change the state of an object. For example, an application can change the state of an object by applying a method to change the value of an attribute defined for the object. When the application terminates, the object is destroyed and the state information is lost unless the application or the application environment saves the object in persistent storage such as files on a disk. When the state of an object outlives the execution of an application, the state of the object is called persistent, and the object is called a persistent object. When the application starts again, the application or the application environment restores the state of the persistent object from the persistent storage.

In an object-oriented system, a class is a collection of related objects and methods that operate on the objects. FIG. 1 shows selected prior art methods and a constructor of the public class Vector 400 (Java** vector class) of the Java programming language. The Java Vector class 400 is a collection of Java Vector objects and provides methods that can be used for typical operations on elements of the Java Vector objects such as add, delete, read, update etc. Details of the Java programming language are further described in "Java in a Nutshell", by David Flanagan (Copyright O'Reilly & Associates, Inc., 1997), which publication is incorporated herein in reference in its entirety.

The Java Vector class 400 implements a growable array of objects. Like an array, the Java Vector class 400 contains components that can be accessed using an integer index. However, the size of a vector can grow or shrink as needed to accommodate adding and removing items after the vector has been created. The constructor Vector( ) 402 constructs an empty vector. The method elementAt(int) 404 returns the component at the specified index. The method addElement (Object) 406 adds the specified component to the end of a vector, increasing the size of the vector by one. The method removeElementAt(int) 408 deletes the component at the specified index. The method setElementAt(Object, int) 410 updates the component at the specified index of a vector to be the specified object. The method insertElementAt(Object, int) 412 inserts the specified object as a component in this vector at the specified index.

In prior art, there are indirect ways to create and save the state of persistent objects via object serialization. For classes that implement the serializable 414 interface, such as the Java Vector class 400, a programmer can modify the source code of an application to write the complete state of an object to a file output stream, and then recreate the object at a later time by reading the state of the object from the file's input stream. If serialized objects are written to a file's output stream, persistent objects are created. However, the methods in the Java Vector class 400 do not directly create and manipulate persistent objects. Hence, there is a need in the art to provide improved technologies for making vector objects, such as Java Vector objects, persistent.

SUMMARY OF THE PREFERRED EMBODIMENTS

Provided are a method, system and article of manufacture for implementing an array of persistent elements. A class of the array of persistent elements has a constructor. A call is received from an application executing in a runtime environment to the constructor. The constructor is processed to create an empty array of persistent elements. A persistent element is included into the array of persistent elements within the runtime environment. In response to including the persistent element in to the array, persistent data of the added persistent element is stored in a data record and the address of the data record is stored at a corresponding index record.

In a further implementation the data record is stored in a data file, and the index record is stored in an index file. The data file stores a plurality of data records and the index file stores a plurality of index records. Further implementations are provided for adding, removing, accessing, inserting, and setting elements in objects of the persistent Java Vector class.

In still further implementations a method, system and article of manufacture are provided for manipulating objects in an object oriented database. An object data store includes a plurality of persistent objects, wherein each persistent object is associated with an object index. Each of the plurality of object oriented objects is an instance of a class. An application program calls methods of the class of persistent array elements. In response, the persistent objects are manipulated within a runtime environment. Any modifications to the persistent objects are persistent.

In one implementation, the persistent objects are instantiated from the class. Each object includes a key value. The object oriented database also provides a node data structure including nodes, wherein each node is a persistent object instantiated from the class. Each node represents one persistent object in the object store and includes one object index used to access the persistent object represented by the node in the object store. The nodes in the node data structure are organized according to the key values in the objects represented by the nodes. An application uses the node data structure to access the objects in the object store by applying methods of the class. In one implementation, the methods of the class are used to perform access operations, addition operations, insertion operations and deletion operations on the nodes and persistent objects.

If an application instantiates an object from a persistent vector class, the state of the object outlives the execution of the application. The methods of the class, such as the Java persistent vector class, maintain persistent objects. For example, database objects instantiated from the class and stored within an object oriented database in a database server can be manipulated either from within the database server or from a database client by using the methods of the persistent vector class. Not only are the database objects persistent but the methods of the persistent vector class can be applied to the database objects to perform database operations.

BRIEF DESCRIPTION OF THE DRAWINGS

Referring now to the drawings in which like reference numbers represent corresponding parts throughout:

FIG. 1 illustrates selected prior art methods and a constructor for the Java Vector class;

FIGS. 6a, 6c, 7a, 7c illustrate block diagrams of index files and data files in accordance with certain described implementations of the invention;

FIG. 6b illustrates logic to process the method for adding an element in a persistent Java Vector object in accordance with certain described implementations of the invention;

DETAILED DESCRIPTION OF THE PREFERRED EMBODIMENTS

Figure 2:
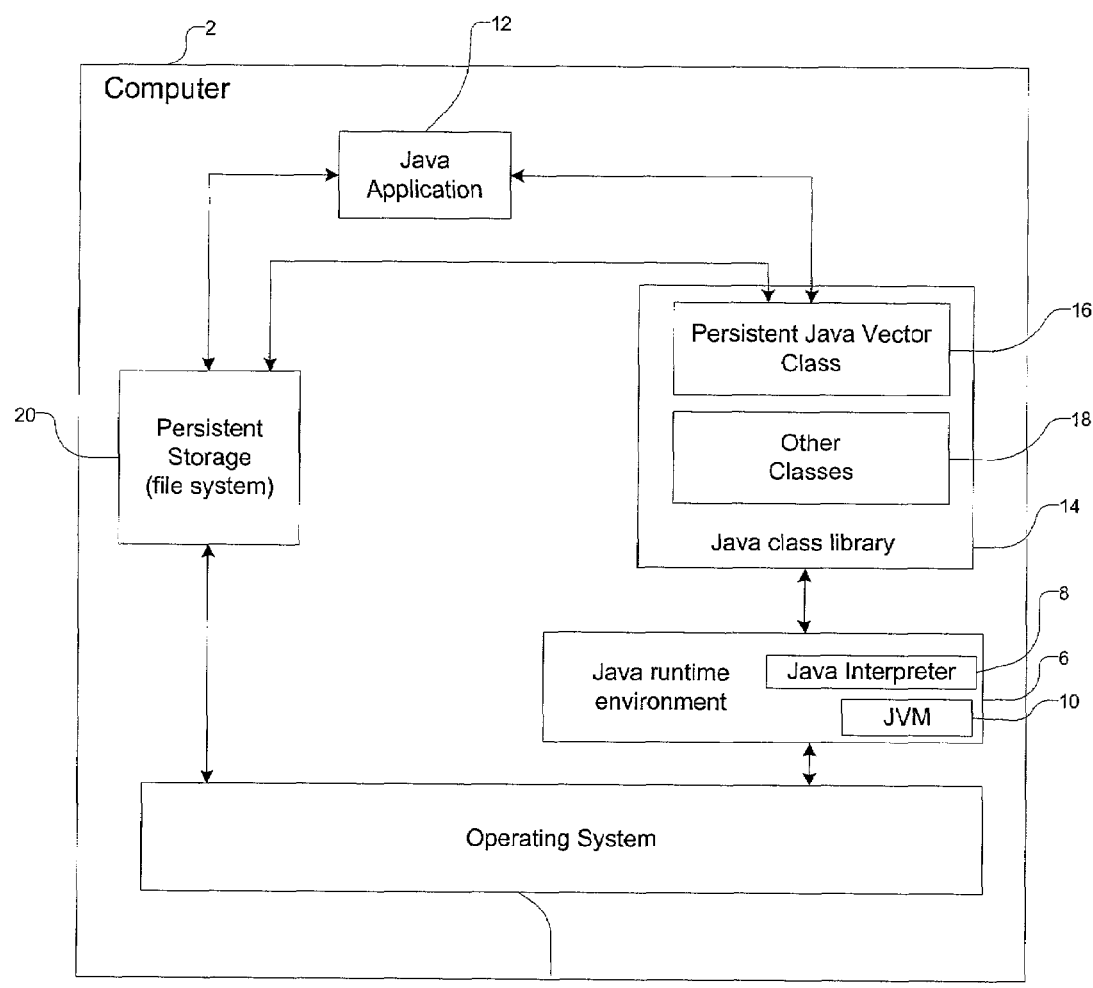
FIG. 2 illustrates a block diagram of a computing environment including certain implementations of the invention.

In the following description, reference is made to the accompanying drawings which form a part hereof and which illustrate several implementations. It is understood that other implementations may be utilized and structural and operational changes may be made without departing from the scope of the present implementations FIG. 2 illustrates a block diagram of a computing environment in which aspects on the invention are implemented, including a computer 2, an operating system 4, and a Java runtime environment 6. The computer 2 may comprise any computational device known in the art including a server class machine, a mainframe, a desktop computer, a laptop computer, a hand held computer, a telephony device etc. The operating system 4 may comprise any operating system known in the art. The operating system can control a persistent storage 20, such as a file system. The Java runtime environment 6 executes a Java application 12.

The Java runtime environment 6 includes a Java interpreter 8 and a Java virtual machine (JVM) 10. The Java interpreter 8 generates platform-independent bytecodes that run inside the JVM 10. The Java application 12 can execute on any machine that supports a JVM 10. The JVM 10 is a program that interprets Java byte codes into machine code. The JVM 10 program allows as Java program to execute on different operating systems. The Java runtime environment 6 interacts with the Java class library 14 while executing the Java application 12. The Java class library 14 is a set of pre-compiled Java classes, such as classes for input/output and window management operations, that are available for instantiating objects within the Java application 12. In FIG. 1, the Java class library 14 includes a persistent Java Vector class 16 and other classes 18.

The persistent Java Vector class 16 maintains information on persistent elements where the number of persistent elements is scalable. The persistent Java Vector class 16 may be implemented in a variety of ways, such as for example by implementing similar interfaces to the Java Vector class 400 or by extending the Java Vector class 400. The persistent Java Vector class 16 includes methods to insert persistent elements into an array, to delete persistent elements from the array, or to search for specified persistent elements within the array. The Java runtime environment 6 saves persistent Java Vector objects of the persistent Java Vector class 16 into the persistence storage 20, such as a file system, when the Java application 12 executes under the control of the Java runtime environment 6. The persistent storage 20 may be implemented with a variety of persistent software elements such as sequential files, databases, spreadsheets and so on. The data of the persistent software elements may be stored in a non-volatile storage device such as a disk drive, a tape drive, a CDRom drive, a Zip** drive etc.

JAVA is a trademark of Sun Microsystems, Inc.; and  ZIP is a trademark of Iomega corporation.

Figure 3:
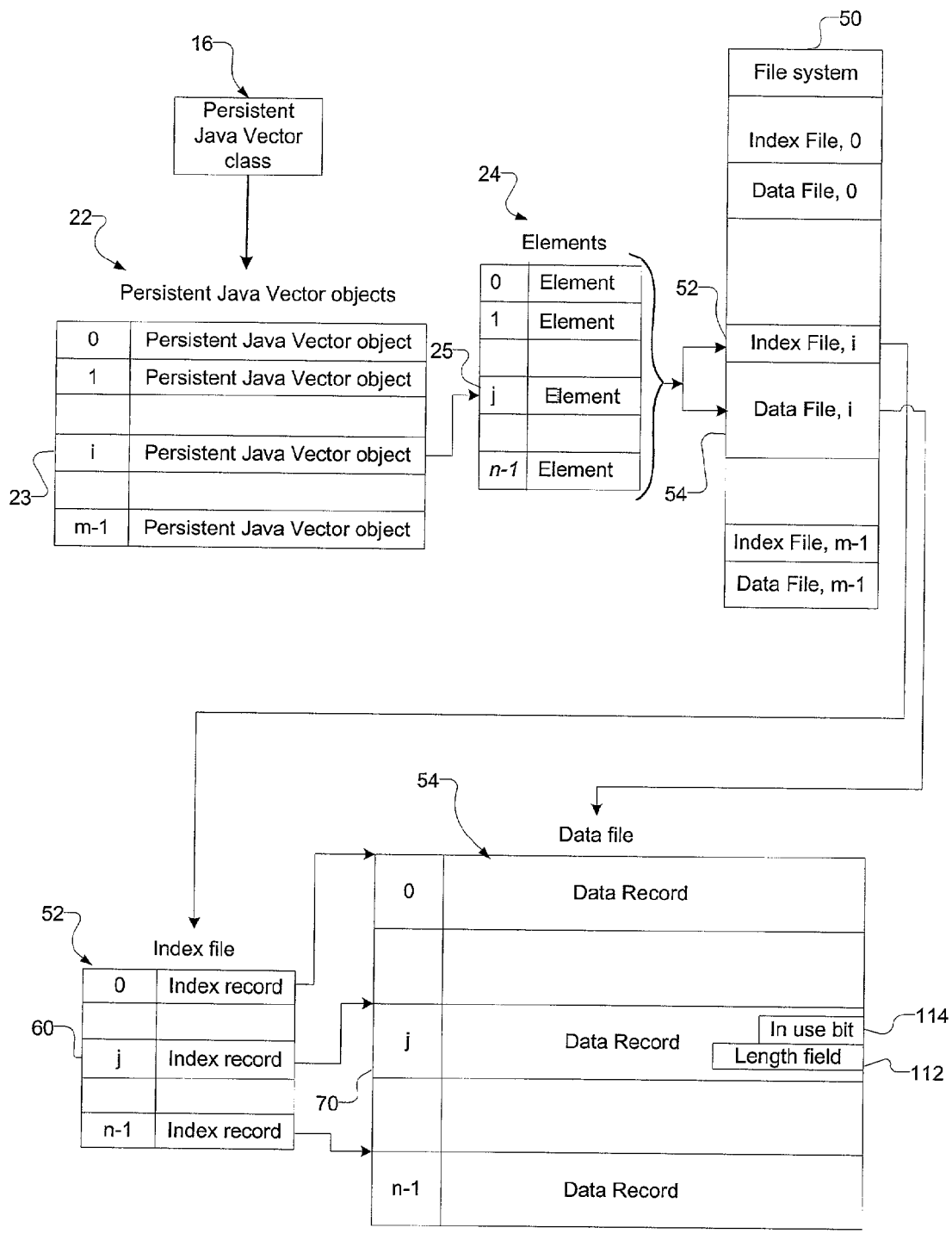
FIG. 3 illustrates the data structures associated with a persistent Java Vector object in accordance with certain described implementations of the invention.

FIG. 3 illustrates the file system data structures that store the persistent data of persistent Java Vector objects in accordance with certain implementations of the invention. The data structures illustrated in FIG. 3 may reside in the computer 2. The Java application 12 calls a constructor to create 0 . . . (m−1) persistent Java Vector objects 22, where the persistent Java Vector objects 22 are instances of the persistent Java Vector class 16. An $i^{th}$ persistent Java Vector object 23 (where i=0, . . . ,m−1) has 0 . . . (n−1) elements 24. All the persistent data of the n elements 24 of the $i^{th}$ persistent Java Vector object 23 (i=0, . . . ,m−1) are kept within a non-volatile memory such as the file system 50, in a data file i 54, and in an index file i 52. Thus for every persistent vector object 0 . . . (m−1) there is an index file i (where i=0, . . . ,m−1) and a data file i (where i=0, . . . ,m−1). The persistent Java Vector objects 22 and the elements 24 may be present in volatile memory. When the Java application 12 stops running, the persistent Java Vector objects 22 and the elements 24 are no longer present. However, the persistent data of the elements 24 of the persistent Java Vector objects 22 are retained for later recovery within the non-volatile file system 50 in the index files and the data files.

If there are n elements 24 in the $i^{th}$ persistent vector object 23 then the index file 52 corresponding to the $i^{th}$ persistent vector object 23 contains n fixed length index records 0 through n−1, where in one implementation each index record is 4 bytes in length. Corresponding to the $j^{th}$ index record 60 (j=0, . . . ,n−1) in the index file 52, there is a $j^{th}$ data record 70 in the data file 54. The persistent data of the $j^{th}$ element 25 of the $i^{th}$ persistent vector object 23 is stored in a $j^{th}$ data record 70. The $j^{th}$ index record 60, where j=0 . . . ,(n−1), representing the $j^{th}$ element 25 of the $i^{th}$ persistent Java Vector object 23, contains the starting address of the $j^{th}$ data record 70. The starting address of the $j^{th}$ data record 70 can be provided in various ways, for example as an offset from the beginning of the data file 54.

As shown in the $j^{th}$ data record 70, each data record has a length field 112 that provides the length of the data record. Each data record also has an "in use bit" 114. If the "in use bit" 114 is zero, i.e. turned off, then the data record is not currently reserved for an element of a persistent Java Vector object and is available for reuse. If the "in use bit" 114 is one, i.e. turned on, then the data record is already reserved for an element of a persistent Java Vector object. For example, when a $j^{th}$ element 25 is deleted from the $i^{th}$ persistent Java Vector object 23, the $j^{th}$ data record 70 in the data file 54 may have the "in use bit" 114 turned off. Correspondingly, if a $j^{th}$ element 25 is inserted into the $i^{th}$ persistent Java Vector object 23 the $j^{th}$ data record 70 may have the "in use bit" 114 turned on.

Figure 4:
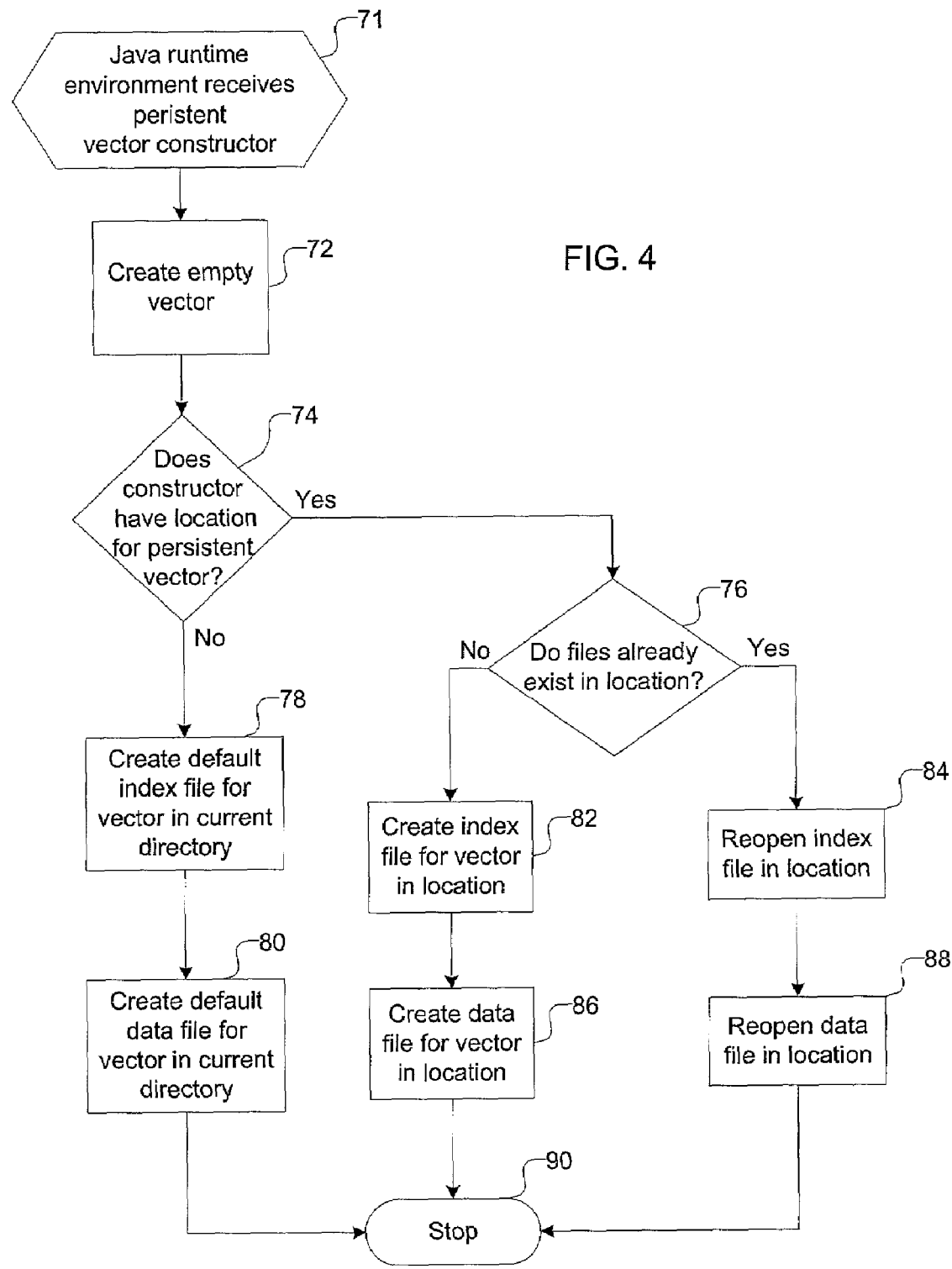
FIG. 4 illustrates logic to process constructors of the persistent Java Vector class in accordance with certain described implementations of the invention.

FIG. 4 illustrates logic implemented in a Java runtime environment 6 to process constructors of the persistent Java Vector class 16. The persistent Java Vector class 16 may have two constructors, PersistentVector( ) and PersistentVector(String pathname). Each of the constructors of the persistent Java Vector class 16 instantiates an empty $i^{th}$ persistent Java Vector object 23 whose index file 52 and data file 54 reside on the filesystem 50.

The Java runtime environment 6 receives (at block 71) from Java application 12 the code that corresponds to the constructor for a Java Vector object. The Java runtime environment 6 creates (at block 72) an empty persistent Java Vector object 23. The Java runtime environment 6 determines (at block 74) whether the constructor has a pathname in the parameter. The pathname is a location in persistent storage, such as the filesystem 50 that stores the persistent data, i.e. the index file 52 and the data file 54 of the empty persistent vector object 23.

If the constructor does not have a pathname in the parameter then the Java runtime environment 6 creates (at block 78) a default index file 52 for the persistent vector object 23 in the current directory of the Java runtime environment 6. The Java runtime environment 6 then creates (at block 80) a default data file 54 for the persistent vector object 23 in the current directory of the Java runtime environment 6 and the process stops (at block 90).

If the constructor does have a pathname in the parameter then the Java runtime environment 6 determines (at block 76) whether index 52 and data 54 files already exist in the pathname in the parameter. If index and data files already exists (i.e. persistent data corresponding to the Java Vector object 23 was saved at an earlier execution of Java application 12) then the Java runtime environment 6 first reopens (at block 84) the index file 52 corresponding to the location given by the pathname, and then reopens (at block 88) the data file 54 corresponding to the location given by the pathname. Reopening a file involves retrieving the file from the file system 50 such that read/write operations can be performed on previously stored records within the file. Subsequently, the process stops (block 90).

If index file 52 and data file 54 do not exist, then the Java runtime environment 6 first creates (at block 82) an index file 52 for the persistent vector object 23 in the location given by the pathname and creates (at block 86) a data file 54 for the persistent vector object 23 in the location given by the pathname. Subsequently, the process stops (block 90).

Figure 5:
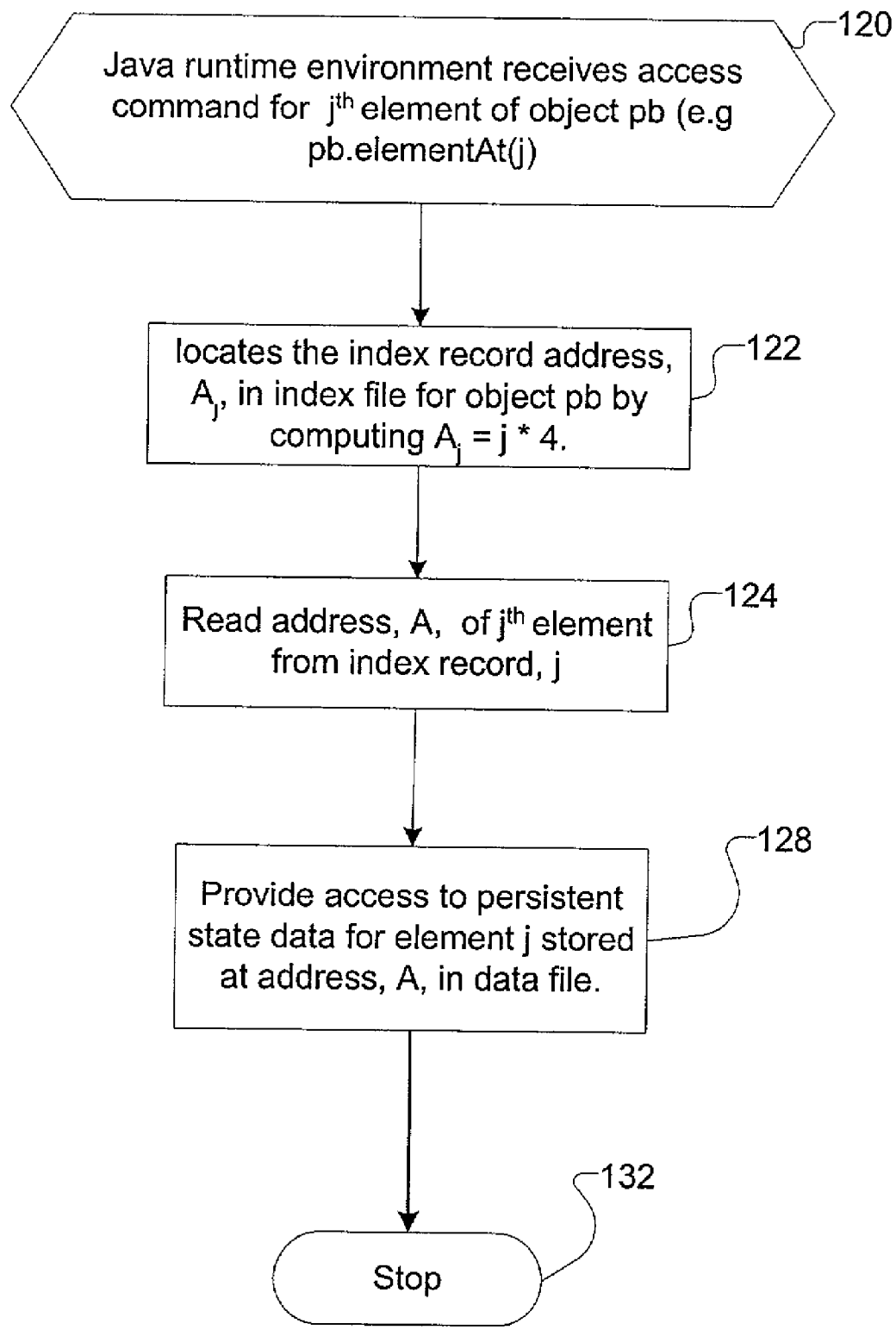
FIG. 5 illustrates logic to process the method for accessing an element in a persistent Java Vector object in accordance with certain described implementations of the invention.

FIG. 5 illustrates logic implemented in a Java runtime environment 6 to process the method for accessing the $j^{th}$ element 25 in a persistent Java Vector object 23 in accordance with certain implementations of the invention. The method for accessing an element in the persistent Java Vector class 16 is elementAt(int). At block 120, the Java runtime environment 6 receives an instruction from the Java application 12 to access the $j^{th}$ element 25 of a persistent Java Vector object pb, e.g. persistent Java Vector object 23, where "pb" is the name identifying the persistent Java Vector object 23. The instruction in the Java programming language is pb.elementAt(j). Since each index record in the index file 52 is 4 bytes long the Java runtime environment 6 has to calculate the starting address of the $j^{th}$ index record 60 in the index file 52. At block 122, the Java runtime environment 6 locates the index record address $A_j$ in the index file 52 for the persistent Java Vector object pb by multiplying the integer j by four (as each index record is four bytes long). The Java runtime environment 6 reads (at block 124) the address A in the address $A_j$ of the index file 52. The address A, is the address of the data record 70 in the data file 54 for the $j^{th}$ element of the persistent Java Vector object pb. Control proceeds to block 128, where the Java runtime environment 6 provides access to the persistent data for element j stored at address A in the data file 54. Subsequently, at block 132, the process terminates.

FIG. 6a illustrates a block diagram of an index file 152 and a data file 154 corresponding to a persistent Java Vector object pb before an element objectX is added to the persistent Java Vector object pb. In FIG. 6a, the index file 152 for persistent Java object pb has n index records 0 . . . (n−1) where each index record contains the address of a data record 0 . . . (n−1) kept in the data file 154. The last address of the data file 154 for object pb is H 169, i.e. H 169 is the highest address of data record (n−1) 168.

FIG. 6b illustrates logic implemented in a Java runtime environment 6 to process the method for adding an element objectX in the persistent Java Vector object pb in accordance with certain implementations of the invention. In the logic illustrated in FIG. 6b, the Java runtime environment 6 receives (at block 140) an instruction pb.addElement(objectA) from the Java application 12. The method addElement(objectX) adds the object "objectX" to the end of a persistent Java Vector, increasing the size of the persistent Java Vector by one.

In FIG. 6b after executing block 140, control proceeds to block 142 where the Java runtime environment 6 appends a four byte index record 170 (shown in FIG. 6c) to the index file 152 for object pb. FIG. 6c illustrates a block diagram of the index file 152 and the data file 154 after adding the element "ObjectX" in the persistent Java Vector object in accordance with certain implementations of the invention. In FIG. 6b, after executing block 142 control proceeds to block 144, where the Java runtime environment 6 determines the address of the highest byte H (reference numeral 169), of the data file of the object pb. Control proceeds to block 146, where the Java runtime environment 6 sets index record n (reference numeral 170) to the address H+1 (reference numeral 171). Control proceeds to block 148, where the Java runtime environment 6 adds the persistent data for the element "ObjectX" in the data record 172, and sets the "in use bit" of data record 172 to one.

Figure 7A:
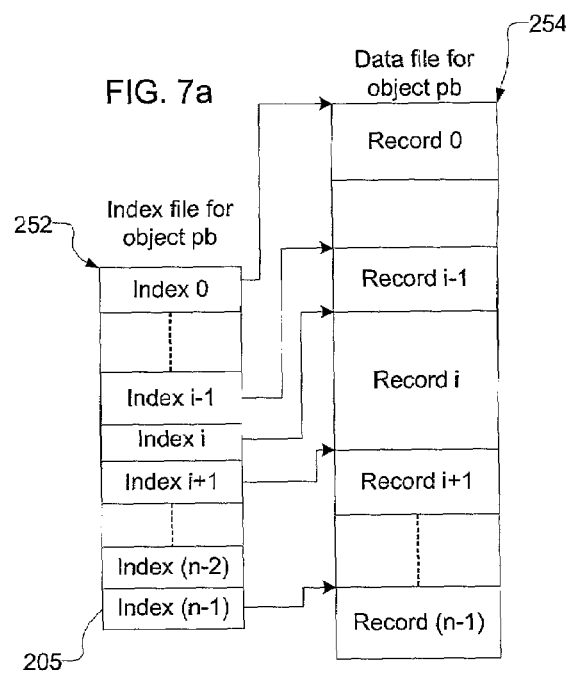

FIG. 7a illustrates a block diagram of an index file 252 and a data file 254 before removing an element in a persistent Java Vector object pb. The index file 252 for object pb has n index records 0 . . . (n−1) each containing the address of a data record 0 . . . (n−1) in the data file 254 for object pb.

Figure 7B:
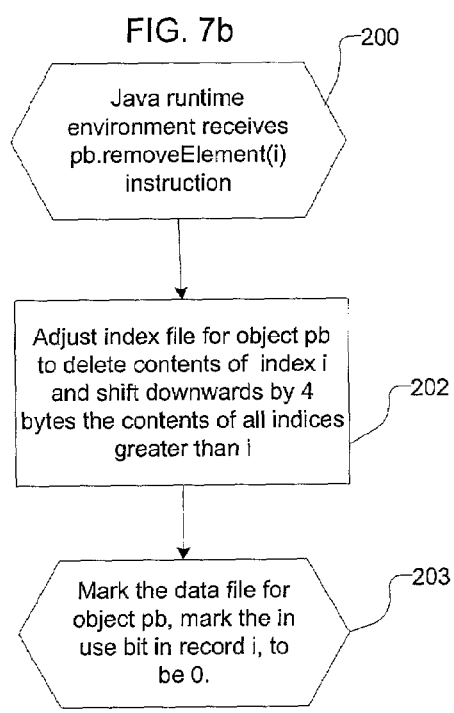
FIG. 7b illustrates logic to remove an element from a persistent vector object in accordance with certain described implementations of the invention.

FIG. 7b illustrates logic implemented in a Java runtime environment 6 to process the method for removing an element in a persistent Java Vector object. At block 200, the Java runtime environment 6 receives an instruction pb.removeElement(i) from the Java application 12. At block 202, the Java runtime environment 6 adjusts the index file 252 for pb to delete contents of index i and shifts downwards by four bytes the contents of all index records greater than i. Shifting downwards by four bytes means that index record k is moved to the location of index record k−1 where k varies from i+1 to n−1 (the result in shown in FIG. 7c).

Figure 7C:
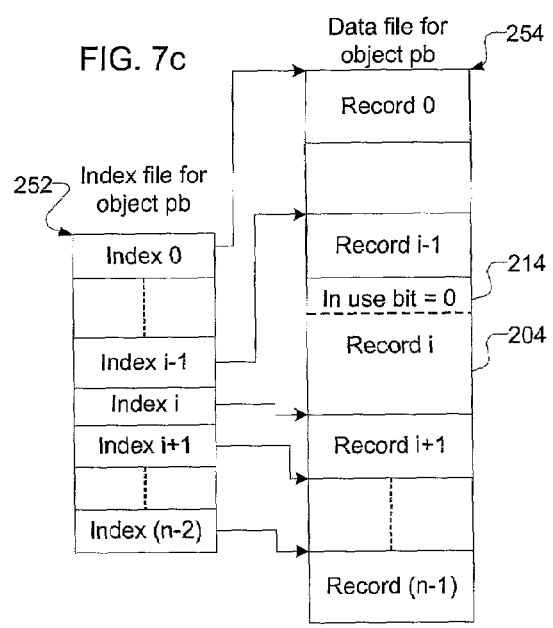

FIG. 7c illustrates a block diagram of the index file and the data file after removing an element in a persistent Java Vector object. In FIG. 7c, index record (n−1) shown in FIG. 7a (reference numeral 205 in FIG. 7a) has been removed by the operation of block 202 in the logic of FIG. 7b. After processing block 202, control proceeds to block 203, where the Java runtime environment 6 marks the "in use bit" 214 of data record i (reference numeral 204) in the data file 254 for object pb to be zero. The data record i is no longer in use. Unlike the index record for element i which is removed from the index file 252, the data record for element i is not removed from the data file 254. The data file 254 is much larger than the index file 252 and rearranging the records of the data file 254 would be time consuming if a data record is removed from the data file 254. Such savings of processing cycles are significant for very large vector objects. In alternative implementations, the data record for element i could be removed from the data file 254 and the records of the data file 254 rearranged.

Figure 8:
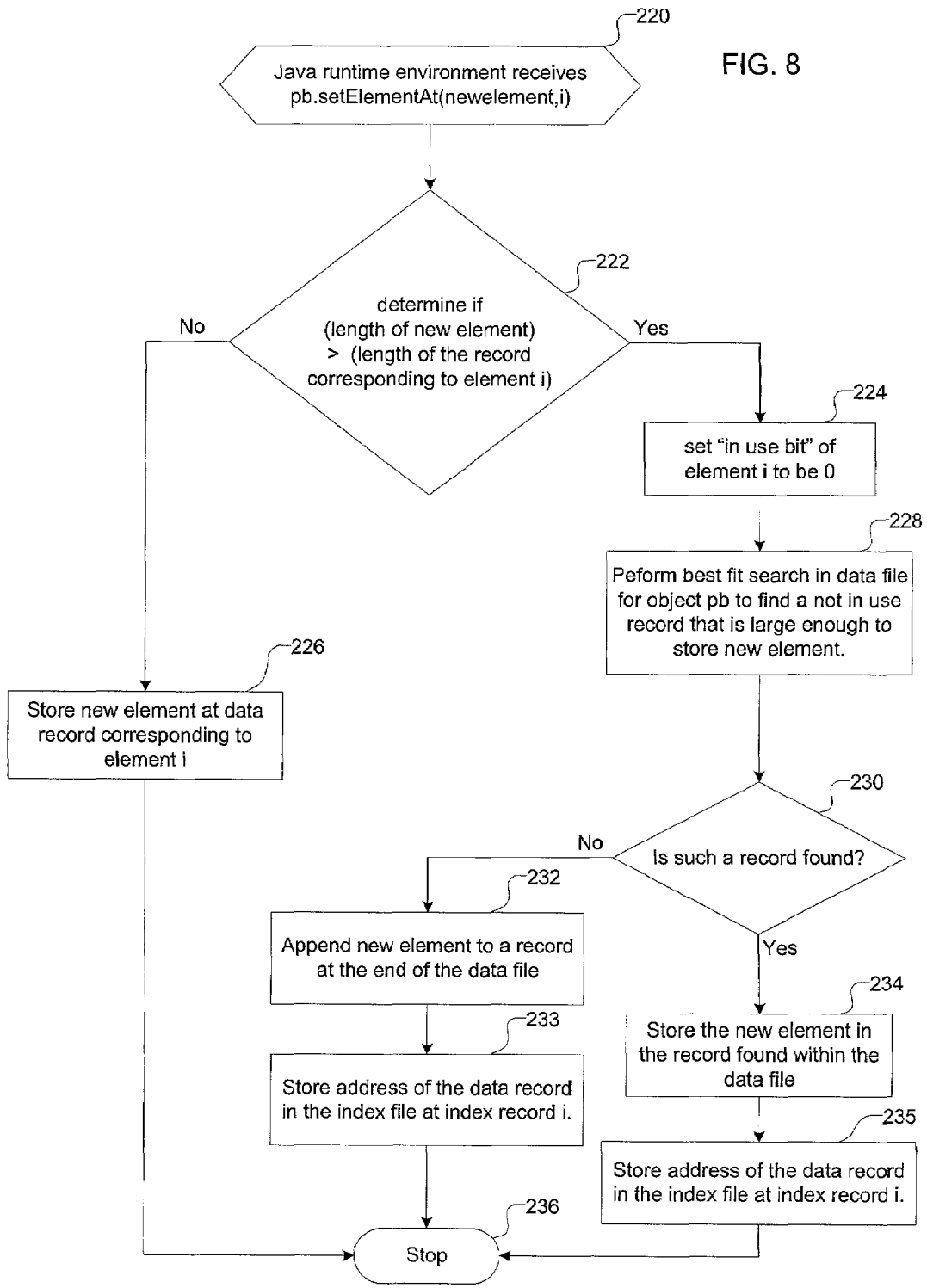
FIG. 8 illustrates logic to update an element in a persistent Java Vector object in accordance with certain described implementations of the invention.

FIG. 8 illustrates logic implemented in a Java runtime environment 6 to process the method for updating an element to a specified index in a persistent Java Vector object by a setElementAt method. The setElementAt method replaces an element at a specified index with a new element. At block 220, the Java runtime environment 6 receives an instruction pb.setElementAt(newelement, i) from the Java application 12 where pb is the identifier of a persistent Java Vector object. Control proceeds to block 222, where the Java runtime environment 6 determines whether in the data file for object pb, the length of the element "newelement" is greater than the length of the data record corresponding to element i. If the length of the element "newelement" is greater than the length of the data record corresponding to element i, then the Java runtime environment 6 sets (at block 224) the "in use bit" of the data record i corresponding to index record i to be zero. The Java runtime environment 6 performs (at block 228) a best fit search in the data file of object pb to find a data record i with an "in use bit" of zero that is large enough to store the element "newelement." If such a data record i is found (at block 230) the Java runtime environment 6 stores (at block 234) the persistent data of the element "newelement" in the data record found within the data file. Subsequently, at block 235 the Java runtime environment 6 stores the address of the data record found in block 230 at the index record i in the index file and the process stops (at block 236).

If at block 230, a data record with an "in use bit" of zero that is large enough to store the element "newelement" is not found control proceeds to block 232 where the Java runtime environment 6 appends the persistent data of the element "newelement" to a data record at the end of the data file. Subsequently, at block 233 the address of the data record appended in block 232 is stored at index record i in the index file and the process stops (at block 236).

If at block 222, the Java runtime determines that the length of the element "newelement" is less than or equal to the length of the data record corresponding to element i, then the Java runtime environment 6 stores (at block 226) the persistent data of the element "newelement" at the data record that corresponds to element i. The index files does not need to be updated and the process stops (at block 236).

Figure 9:
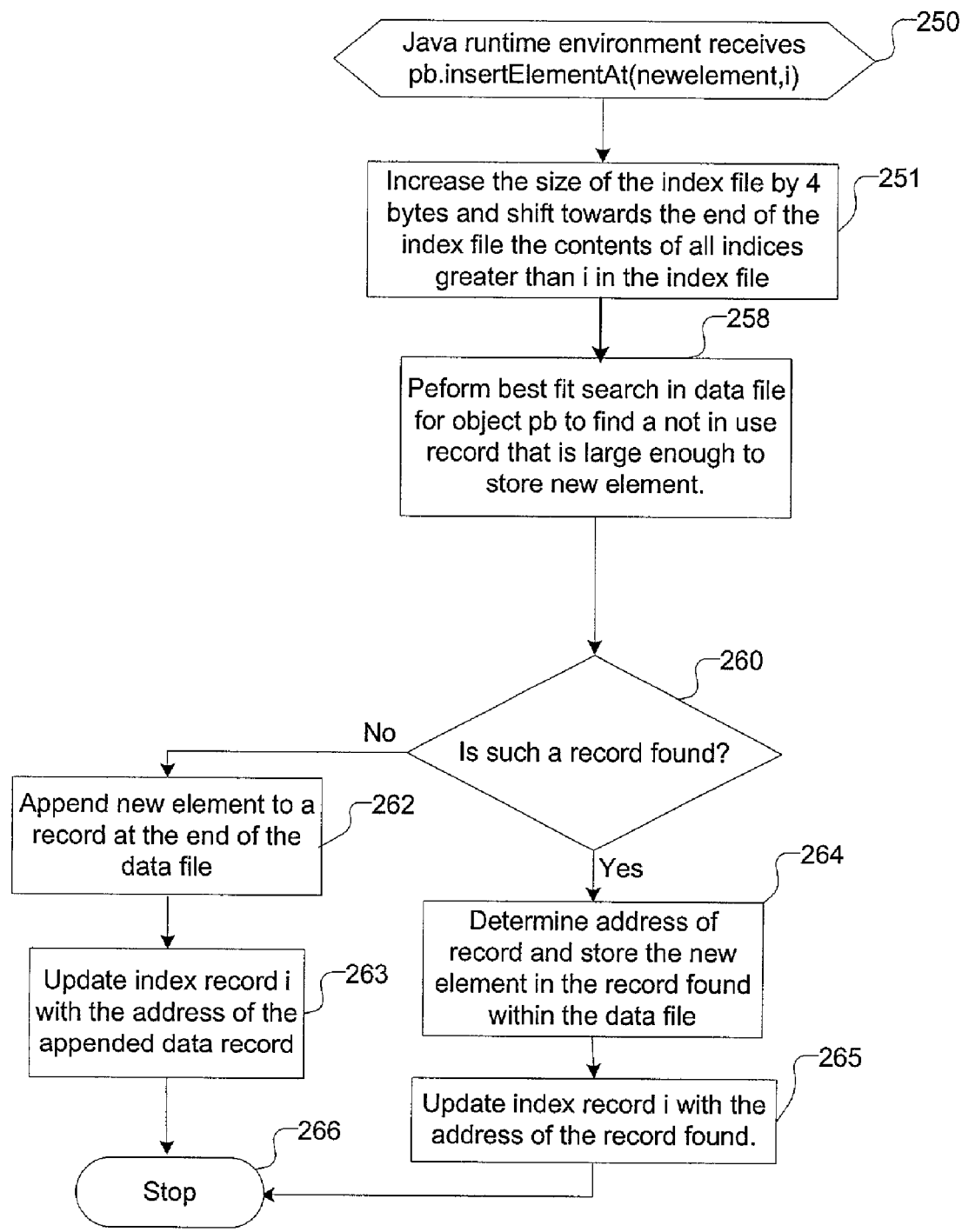
FIG. 9 illustrates logic to insert an element to a persistent vector object in accordance with certain described implementations of the invention.

FIG. 9 illustrates logic implemented in a Java runtime environment 6 to process the method for inserting an element in a persistent Java Vector object. At block 250, the Java runtime environment 6 receives an instruction pb.insertElement(newelement,i) from the Java application 12 where pb is the identifier of a persistent Java Vector object. The Java runtime environment 6 increases the size of the index file by four bytes and shifts (at block 251) by four bytes towards the end of the index file the contents of all indices greater than i (each index record is 4 bytes long).

Control proceeds to block 258, where the Java runtime environment 6 performs a best fit search in the data file for object pb to find a data record with a zero "not in use" bit, where the data record is large enough to store the persistent data of the element "newelement." If the Java runtime environment 6 finds (at block 260) such a data record control proceeds to block 264. At block 264, the Java runtime environment 6 determines the address of the data record found within the data file and stores the persistent data of the element "newelement" in the data record found within the data file. Subsequently, the Java runtime environment 6 updates (at block 265) the index record i in the index file of object pb with the address of the data record found in block 264 and the process stops (at block 266). If a "not in use" data record is not found (at block 260), the Java runtime environment 6 appends (at block 262) the persistent data of the element "newelement" to a data record at the end of the data file and proceeds to update (at block 263) the index record i for the index file of object pb with the address of the appended data record at block 262. The process then stops.

Figure 10:
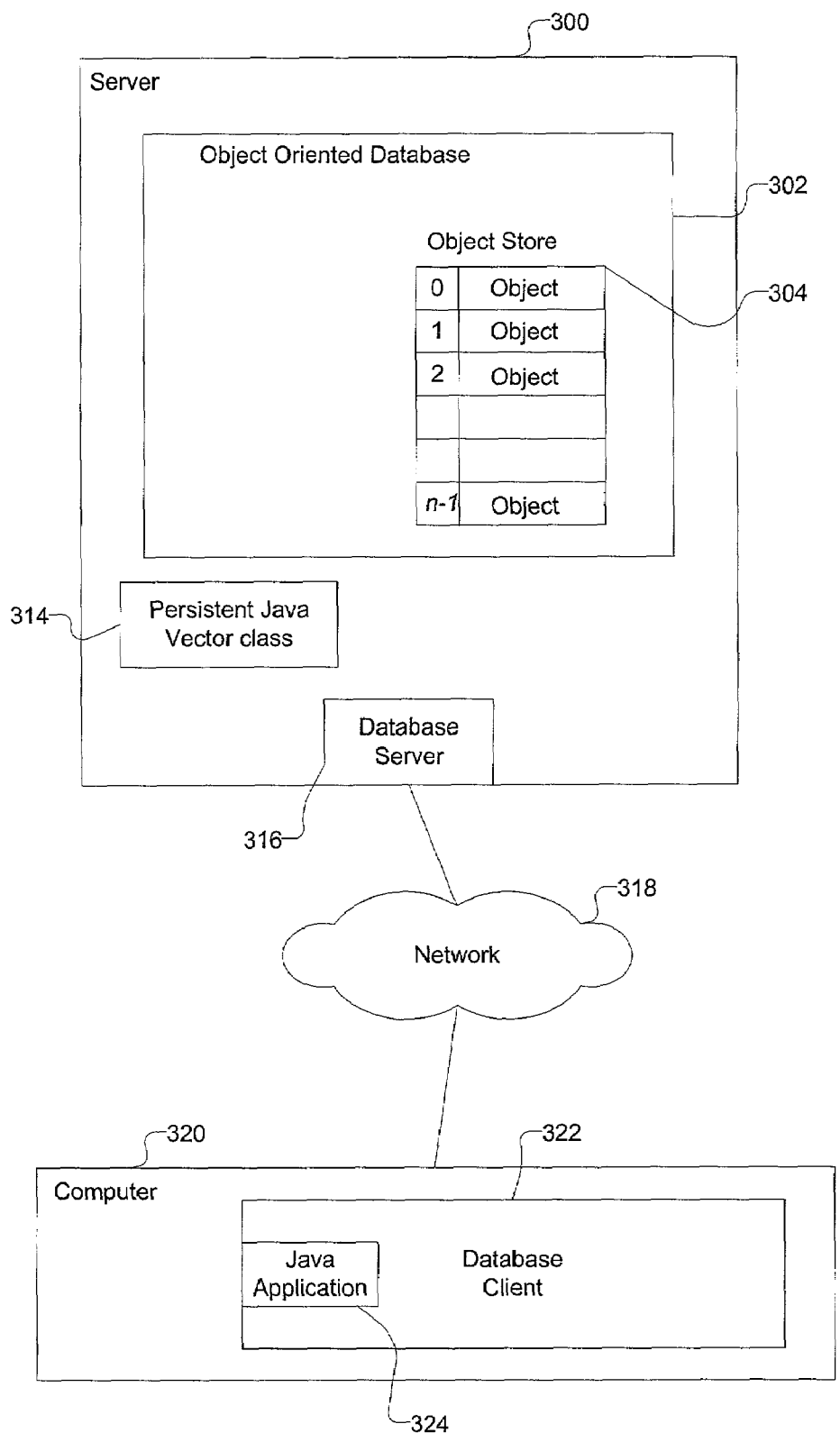
FIG. 10 illustrates a block diagram of a computing environment with an object oriented database and a database client including certain implementations of the invention.
Figure 11:
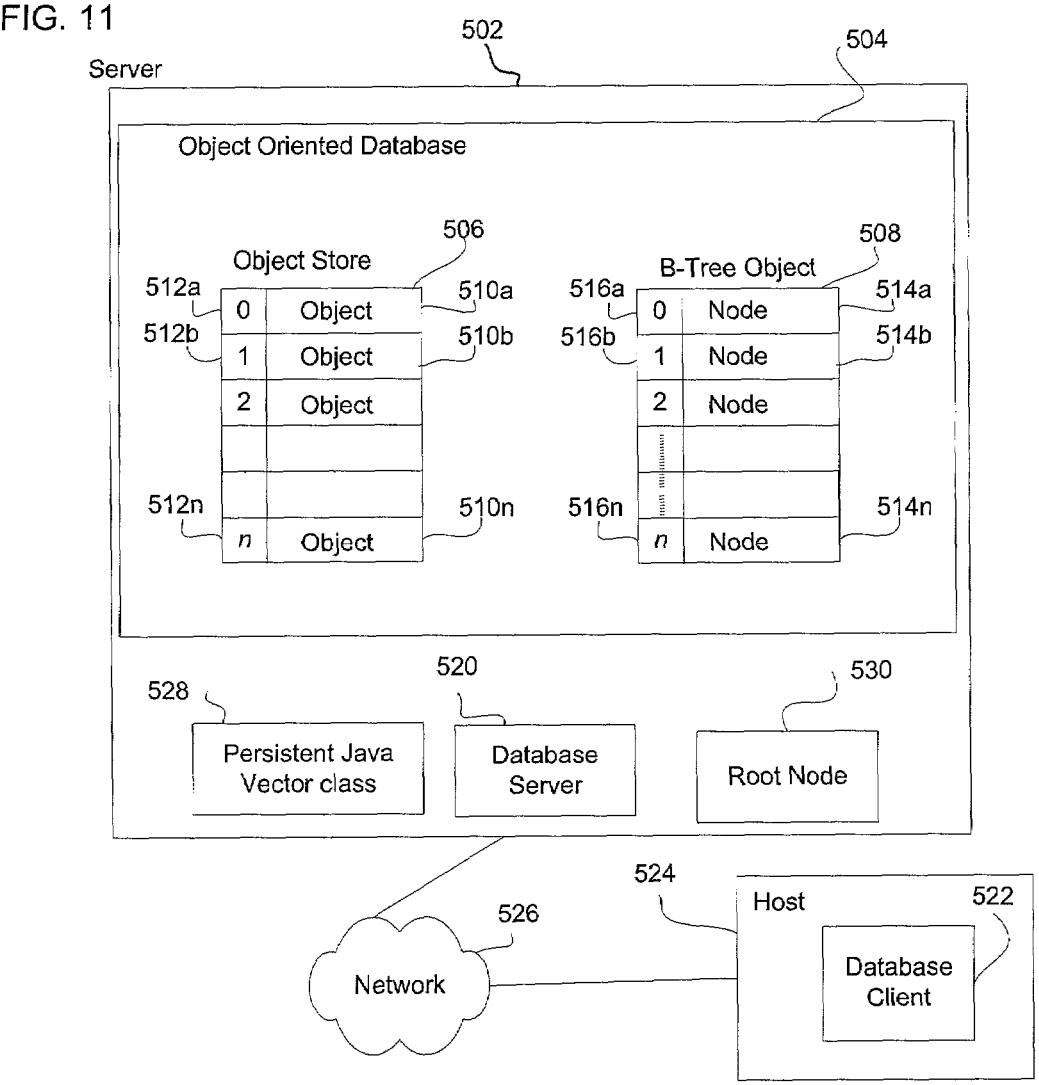
FIG. 11 illustrates another object oriented database environment in which certain aspects of the invention are implemented.

FIG. 10 illustrates a block diagram of a computing environment with an object oriented database and a database client, in which certain aspects of the invention are implemented. Further details of the computing environment of FIG. 11, are disclosed in the following copending and commonly assigned patent application entitled "Method, System, Program and Computer Readable Medium for Indexing Object Oriented Objects in an Object Oriented Database" having U.S. patent application Ser. No. 09/844,474 and filed on Apr. 27, 2001, which patent application is incorporated herein by reference in its entirety.

An object-oriented data base management system (OODBMS) often provides persistent storage for objects. The OODBMS is implemented using the Java programming language, and stores objects of the persistent Java Vector class. The methods of the persistent Java Vector class are not limited to the methods described in FIGS. 5, 6b, 7b, 8, and 9 but can include additional methods. It is desirable for Java applications, such as database server applications and Java based database client applications, that interact with the OODBMS to generate and manipulate the objects stored in the database directly by using the methods that operate on the objects. The Java applications that interact with the OODBMS, may use the methods of the persistent Java Vector class to manipulate the persistent Java Vector objects in the database.

In FIG. 10, a server 300 includes an object oriented database 302 that includes an object store 304, a persistent Java Vector class 314, and a database server program 316. The object store 304, includes a plurality of n objects 0 . . . (n−1). Each object in the object store 304 has an associated index that is used to access the object. For certain implementations, the object store is implemented as a persistent Java Vector object, where the elements of the Java Vector object (the elements are also objects) are accessed by the associated index values 0, 1, 2, . . . (n−1).

The database server program 316 manages the object oriented database 302, the object store 304, and the objects 0 . . . (n−1). The database server program 316 executes operations against the database 302, such as adding, updating and deleting objects in the object store 304 and executing queries against the object store 304 using the associated indices of the persistent Java Vector object that implements the object store 304. The database server 316, utilizes the constructors and methods in the Persistent Java Vector class 314 to instantiate the vector of persistent objects in the object store 304 and manipulate the objects therein, e.g. adding, inserting, deleting, updating etc. The database server program 316 thus includes the program components that perform database management and access operations.

In one implementation, a database client program 322 implemented on a computer 320 communicates with the server 300 over a network 318. The database client program 322 is capable of interfacing with a user of the database 302 and communicating database operation requests, such as adding, updating, and deleting records, to the database server program 316, to execute against the object store 304. In one implementation, the database client 322 comprises a Java application 324, where the Java application 324 directly manipulates the objects in the object store 304 via the methods of the Persistent Java Vector class 314.

FIG. 11 illustrates an additional object oriented database environment in which aspects of the invention are implemented. Further details of the computing environment of FIG. 11, are given in the following copending and commonly assigned patent application entitled "Method, System, Program and Computer Readable Medium for Indexing Object Oriented Objects in an Object Oriented Database" incorporated by reference above.

A server 502 includes an object oriented database 504 that comprises an object store 506 and a balanced tree, "B-Tree", object 508. The object store 506 includes a plurality of objects 510a, b . . . n, where each object comprises an object oriented object that is an instance of a class. Each object 510a, b . . . n in the object store 506 has an associated index value 512a, b . . . n that is used to access the object 510a, b . . . n in the object store 506. In certain implementations, the object store 506 may be implemented as a persistent Java Vector, using the interfaces of the persistent Java Vector class 528. In such cases, the objects 510a, b . . . n in the persistent Java Vector are accessed using the index value 512a, b . . . n of the object. In persistent Java Vector implementations, the index value 512a, b . . . n provides a unique identifier or handle for the object 510a, b . . . n in the object store 506.

The object oriented database 504 further includes an implementation of the B-Tree object 508, where each node 514a, b . . . n of the B-Tree object 508 represents one of the objects 510a, b . . . n in the object store 506. Each B-Tree node 514a, b . . . n has a corresponding index value 516a, b . . . n that comprises a unique identifier of the node 514a, b . . . n in the B-Tree object 508 that is used to access the node 514a, b . . . n in the B-Tree object 508. The B-Tree object 508 may be implemented as a persistent Java Vector using the persistent Java Vector class.

A database server program 520 comprises a program that manages the database objects within the object oriented database 504 and executes operations against the database 504, such as adding, updating, and deleting objects in the object store 506 and executing queries against the object store 506 using the object store 506 index derived from the B-tree object 508. In implementations where the database objects 506 and 508 comprise persistent Java Vectors, the database server 520 would utilize interfaces in the persistent Java Vector class 528 to instantiate the object store 506 and B-Tree object 508 and manipulate the elements therein. The database server program 520 thus includes the program components that perform the database management and access operations using the persistent Java Vector class 528.

A database client program 522 is capable of interfacing with a user of the database and communicating database operation requests, such as adding, updating, and deleting records, to the database server 520 to execute against the database objects 506 and 508. FIG. 11 shows that the database client 522 is implemented in a host system 524 that communicates with the object oriented database server 520 over a network 526. The database client 522 may also be implemented in the server 502. The data base client 522 may request operations on the object oriented database 504 via the database server 520. The database server 520 converts the requests of the database client 522 into method calls of the persistent Java Vector class 528. In an alternate implementation, the database client 522 may manipulate the object oriented database 504 by directly calling methods of the persistent Java Vector class 528.

Figure 12:
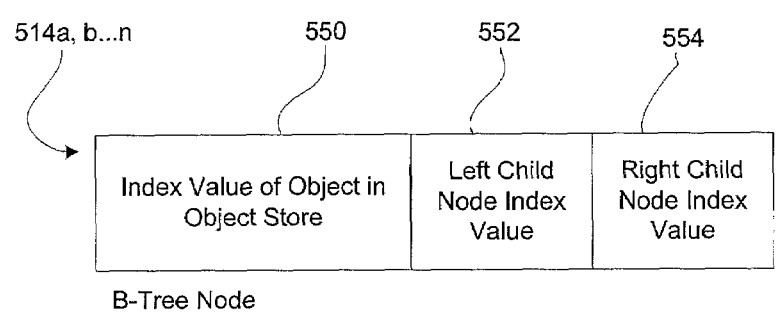
FIG. 12 illustrates an implementation of a data structure of the nodes in a balanced tree object in which certain aspects of the invention are implemented.

FIG. 12 illustrates an implementation of a data structure of the nodes 514a, b . . . n in the B-Tree object 508. Each node 514a, b . . . n in the B-tree object 508 represents a node in a balanced tree data structure known in the art. Each node 514a, b . . . n includes a field 550 having the index value 512a, b . . . n of the object 510a, b . . . n in the object store 506 that the node 514a, b . . . n represents in the B-Tree object 508. A left child node index 552 provides the index value of the left child node in the B-Tree object 508 used to access the left child node and a right child node index 554 comprises the index value 516a, b . . . n used to access the right child node 514a, b . . . n in the B-tree object 508. In this way, the nodes 514a, b . . . n in the B-tree object 508 represent the objects 510a, b . . . n in the object store 506 in a balanced tree or B-Tree data structure that is organized according to one or more key values in the objects 510a, b . . . n.

A root node index value 530 comprises the index value of the root node in the B-Tree implemented in the B-tree object 508. The root node index value 530 (shown in FIG. 11) is stored as an object in a separate location accessible to the database server 520. To traverse the B-Tree implemented in the B-Tree object 508, at each node 514a, b . . . n, the branch taken, e.g., right or left branch, depends upon the outcome of a comparison of the query key, i.e., the key being searched on, and the key for the object 510a, b, . . . n represented by the node. If the query key is less than the key in the object 510a, b . . . n in the node, then the left branch is taken, if greater, the right branch is taken.

In the described implementations, the objects 510a, b . . . n in the object store 506 include a field that has the key value for that object 510a, b . . . n. The database server 520 or database client 522 may issue a Java elementAt(int) method identifying a persistent object and field to obtain the value for a particular field in the persistent objects 510a, b . . . n. In certain implementations, the key value may be maintained in a field within an object embedded in the object 510a, b . . . n. In such a case, the database server 520 or the database client 522 would issue the elementAt(int) method to the embedded object including the field that comprises the key value, and the embedded object would in turn issue the elementAt(int) method against the embedded object including the key value field.

Figure 13:
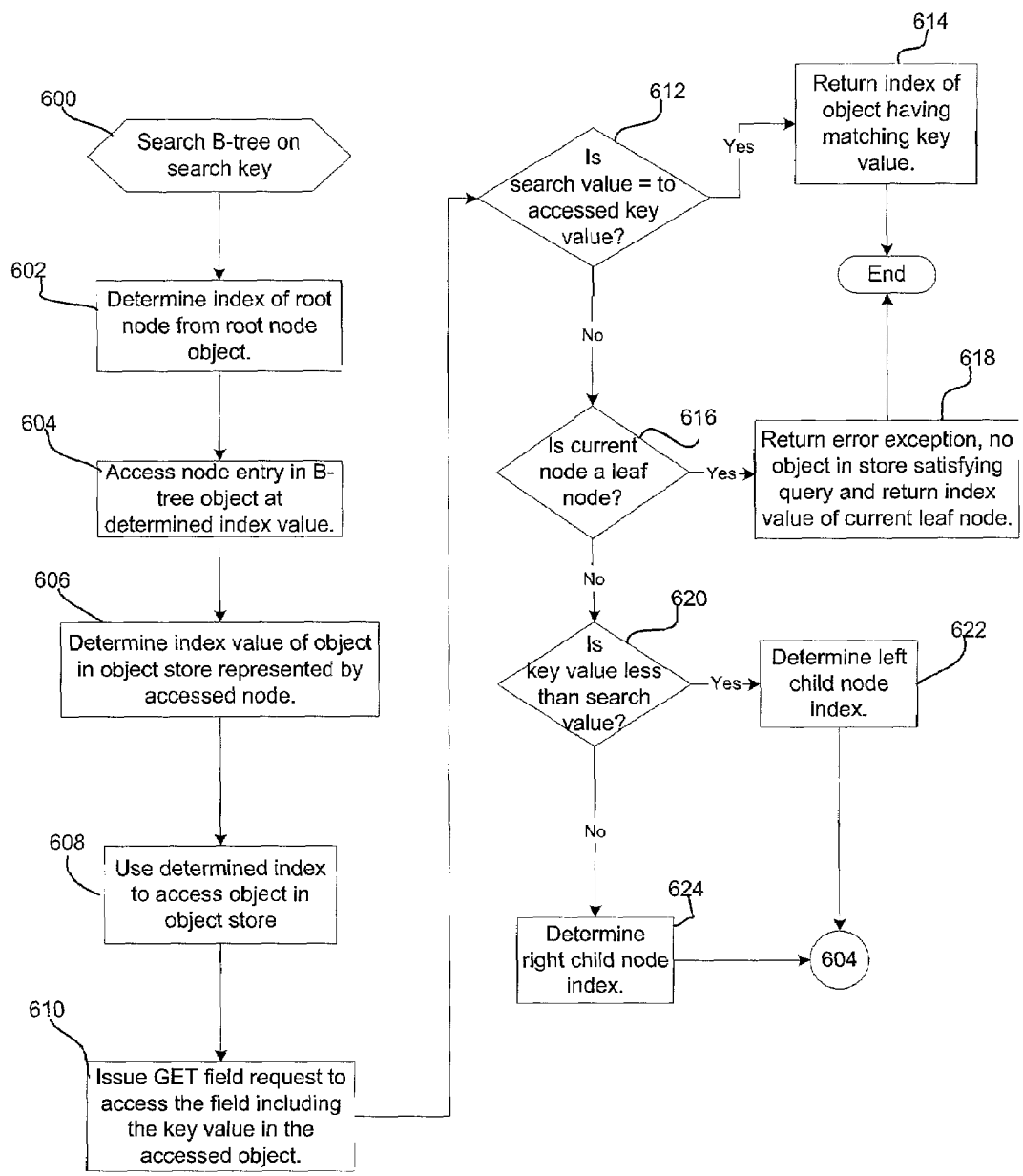
FIG. 13 illustrates logic for a search operation in an object oriented database environment in accordance with certain described implementations of the invention.

FIG. 13 illustrates logic implemented in the database server 502 to execute a search operation to find a node 514a, b . . . n in the B-tree object 508 representing an object 510a, b . . . n in the object store 506 having a key value matching a query value. Control begins at block 600 upon receiving the search value and a call to the find operation. In response, the database server 520 determines (at block 602) the root node index from the root node data 530 maintained in a separate file. The database server 520 then accesses (at block 604) the node entry 514*a, b . . . n* in the B-Tree object 508 at the determined node index 516*a, b . . . n*. For instance, in persistent Java Vector implementations, the database server 520 can use the elementAt(int) method of the Java persistent vector class 528 to access the node 514*a, b . . . n* at the index number 516*a, b . . . n* passed as the parameter to the elementAt( ) function. The database server 520 then determines (at block 606) the index value 512*a, b . . . n* of the object 510*a, b . . . n* represented by the accessed node entry 514*a, b . . . n* from the object index value field 550 in the accessed node entry 514*a, b . . . n*.

The object index 512*a, b . . . n* in the object index value field 550 is then used (at block 608) to access the object 510*a, b . . . n* represented by the accessed node 514*a, b . . . n*. In persistent Java Vector implementations, the elementAt( ) function may be used to access the object 510*a, b, . . . n* in the object store 506 using the determined index value 512*a, b . . . n*. In persistent Java Vector implementations, a Java GET field request is issued (at block 610) to access the key value in the accessed object 510*a, b . . . n*. As discussed, if the key value is located within an object embedded in the object 510*a, b . . . n*, then the object 510*a, b . . . n* issues the GET request against the embedded object including the field that includes the key value.

If (at block 612) the search value is equal to the returned key value in the accessed object 510*a, b . . . n*, then the database server 520 returns (at block 614) the index value 512*a, b . . . n* of the object 510*a, b . . . n* having the matching key value. Otherwise, if (at block 612) the accessed key value does not match the search value, then the database server 520 determines (at block 616) whether the node 514*a, b . . . n* accessed at block 604 is a leaf node. A leaf node may be indicated by setting the left 552 and right 554 node index values to NULL. If the current accessed node 514*a, b . . . n* is a leaf node, then the database server 520 returns (at block 618) an error exception indicating that no object 510*a, b . . . n* includes a key value matching the query value. If the current node is not a leaf node, i.e., there are child nodes, and the determined key value is less (at block 620) than the search value, then the database server 520 determines (at block 622) the left child node index value 516*a, b . . . n* in the field 552 of the accessed node 514*a, b . . . n*. Otherwise, if the key value is greater (at block 620) than the query value, then the right child node index value 516*a, b . . . n* is determined from field 554 in the accessed node 514*a, b . . . n*. From block 622 or 624, control proceeds back to block 604 to access the node 514*a, b . . . n* at the determined index value 516*a, b . . . n*. Also, if there is only one child node, and the determination at blocks 622 and 624 identifies a NULL value for the left or right child node index value, respectively, then control proceeds to block 618 to return an error.

When reaching a leaf node when adding a new node object to the B-Tree object 508, the implementation can invoke the addElement( ) method in the persistent Java Vector class 528 to add a new node object to the B-Tree object 508 representing the B-tree structure. The new node object would be initialized by setting the index value field 50 to a new index value, determined by incrementing the last index value 12*a . . . n* in the object store 68, and setting the left child node Index 52 and right child node index 54 fields to NULL.

With the above implementations, a balanced or B-tree data structure may be used to index and search the object store 506 for an object 510*a, b . . . n* having a key value matching a search query without requiring the use of special object oriented database interfaces. Instead, standard interfaces from the Java persistent vector utility class may be used to access the objects 510*a, b . . . n* in the object store 506 using a B-Tree index of the object store 506 elements implemented in the B-Tree object 508. Thus, adding, deleting, and updating entries in the object oriented database 4 does not require that the objects 510*a, b . . . n* implement interfaces of a special database class or be extended to accommodate special object oriented database classes. In the above described implementations, all that is needed to determine the key value of the object 510*a, b . . . n* is knowledge of the object field that contains the key value. Additionally, the B-Tree object 508 may implement a multi-key B-tree index, in which case the database server 520 would have to use Java GET methods to access multiple key values from the object 510*a, b . . . n*.

With the above implementations, a balanced or B-tree data structure may be used to index and search the object store 506 for an object 510*a, b . . . n* having a key value matching a search query without requiring the use of special object oriented database interfaces. Instead, standard interfaces from the persistent Java Vector class may be used to access the objects 510*a, b . . . n* in the object store 506 using a B-Tree index of the object store 506 elements implemented in the B-Tree object 508. Thus, adding, deleting, and updating entries in the object oriented database 504 does not require that the objects 510*a, b . . . n* implement interfaces of a special database class or be extended to accommodate special object oriented database classes. In the above described implementations, all that is needed to determine the key value of the object 510*a, b . . . n* is knowledge of the object field that contains the key value. In persistent Java Vector implementations, the persistent Java Vector addElement( ) function is used to insert the add object at the end of the object store 506 Java Vector. If the object store 506 vector is full, then the database server 520 would have to grow the vector and reallocate additional space for further objects to add to the object store 6.

The database server 520 may also implement update, delete, insert operations of the objects 510*a, b . . . n* in the object store 6 by calling methods of the persistent Java Vector class. Update is performed by the setElementAt method, delete is performed by the removeElementAt method, and insert is performed by the insertElementAt method in the persistent Java Vector class.

ADDITIONAL IMPLEMENTATION DETAILS

The described vector objects, classes, and methods therein may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (hard disk drives, floppy disks, tape, etc.), optical storage (CD-ROMs, optical disks, etc.), volatile and non-volatile memory devices (EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

While the implementations have been described with reference to the Java programming language they apply to any other object oriented programming language such as C++, Ada, Smalltalk etc. In addition to databases the persistent Java objects can also be used in any application where persistency of data needs to be maintained.

While the implementations have been described with a plurality of index and data files, alternative implementations are possible where the contents of index files and data files are merged in one or more files. Such a merger may involve the merging of several index files or several data files. The merger may also involve the merger of one or more data files with one or more index files.

In FIG. 13, alternate implementations are possible for searching a B-Tree. In particular, when the key value is less than the search value, the database server may determine the "right" instead of the "left" child node index. FIG. 13 can be modified appropriately to take the change into account.

The preferred logic of FIGS. 4, 5, 6b, 7b, 8, 9 and 13 described specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing a vector of persistent objects, comprising:
   (i) providing a constructor for a class of the vector of persistent objects;
   (ii) in response to receiving a call to the constructor from an application executing within a runtime environment, performing:
      (a) processing the constructor; and
      (b) creating an empty vector of persistent objects;
   (iii) including a persistent object into the vector within the runtime environment;
   (iv) in response to including the persistent object into the vector, storing persistent data for the added persistent object into a data record; and
   (v) in response to including the persistent object into the vector, storing an address of the data record at a corresponding index record.

2. The method of claim 1, wherein the class comprises an extension of a Java Vector class.

3. The method of claim 1, wherein the persistent objects comprise an object oriented database and wherein the database is manipulated by method calls on the persistent objects, wherein the method calls retain the persistent objects in a persistent state.

4. The method of claim 1, further comprising:
   storing the data record in a data file;
   storing the index record in an index file, wherein the data file stores a plurality of data records, and wherein the index file stores a plurality of index records.

5. The method of claim 4, wherein the address of the data record is an offset into the data file, wherein the offset is calculated from a starting address of the data file.

6. The method of claim 4, wherein the data file and the index file are stored within a single entity.

7. The method of claim 4, further comprising:
   receiving a request for accessing one persistent object in the vector in the runtime environment;
   locating an index record corresponding to the requested one persistent object from within the index file;
   locating from the index record corresponding to the requested one persistent object, a corresponding address of the data record holding the persistent data of the requested one persistent object; and
   providing access to the persistent data of the requested one persistent object from the located index record.

8. The method of claim 4, further comprising:
   receiving an instruction to add a new persistent object to the vector in the runtime environment appending bytes to the index file to include a new address of the persistent data for the new persistent object;
   appending bytes to the index file to include a new address object of the persistent data for the new persistent object;
   storing in the appended bytes to the index file the new address obtained by incrementing a last data record address; and
   appending the persistent data for the new persistent object to a new data record following the last data record in the data file.

9. The method of claim 4, further comprising:
   receiving an instruction for removing one persistent object of the vector in the runtime environment;
   adjusting contents of the index file to delete a stored address for persistent data corresponding to the one persistent object to remove; and
   marking persistent data for the one persistent object to remove in the data file as not in use.

10. The method of claim 4, further comprising:
    receiving an instruction to update a new object in the runtime environment; storing at a first address in the data file persistent data for the new object; and updating the index file to store the first address.

11. The method of claim 4, further comprising:
    receiving an instruction to insert a new persistent object at a location in the vector in the runtime environment;
    increasing a size of the index file;
    shifting contents in the index file for all objects indexed to indices higher than the index record corresponding to the location in the vector;
    storing persistent data of the new persistent object at a first data record; and
    updating a first index record corresponding to the location in the vector with the address of the first data record.

12. A system for implementing a vector of persistent objects, comprising:
(i) a runtime environment;
(ii) means for providing a constructor for a class of the vector of persistent objects;
(iii) in response to receiving a call to the constructor from an application executing within the runtime environment, means for performing:
(a) processing the constructor; and
(b) creating an empty vector of persistent objects; and
(iv) means for including a persistent object into the vector within the runtime environment;
(v) means for storing persistent data for the added persistent object into a data record in response to including the persistent object into the vector; and
(vi) means for storing an address of the data record at a corresponding index record in response to including the persistent object into the vector.

13. The system of claim 12, further comprising:
means for storing the data record in a data file;
means for storing the index record in an index file, wherein the data file stores a plurality of data records, and wherein the index file stores a plurality of index records.

14. The system of claim 13, further comprising:
means for receiving a request for accessing one persistent object in the vector in the runtime environment;
means for locating an index record corresponding to the requested one persistent object from within the index file;
means for locating from the index record corresponding to the requested one persistent object, a corresponding address of the data record holding the persistent data of the requested one persistent object; and
means for providing access to the persistent data of the requested one persistent object from the located index record.

15. The system of claim 13, further comprising:
means for receiving an instruction to add a new persistent object to the vector in the runtime environment;
means for appending bytes to the index file to include a new address of the persistent data for the new persistent object;
means for storing in the appended bytes to the index file the new address obtained by incrementing a last data record address; and
means for appending the persistent data for the new persistent object to a new data record following the last data record in the data file.

16. The system of claim 13, further comprising:
means for receiving an instruction for removing one persistent object of the vector in the runtime environment;
means for adjusting contents of the index file to delete a stored address for persistent data corresponding to the one persistent object to remove; and
means for marking persistent data for the one persistent object to remove in the data file as not in use.

17. The system of claim 13, further comprising:
means for receiving an instruction to update a new object in the runtime environment;
means for storing at a first address in the data file persistent data for the new object; and
means for updating the index file to store the first address.

18. The system of claim 13, further comprising:
means for receiving an instruction to insert a new persistent object at a location in the vector in the runtime environment;
means for increasing a size of the index file;
means for shifting contents in the index file for all objects indexed to indices higher than the index record corresponding to the location in the vector;
means for storing persistent data of the new persistent object at a first data record; and
means for updating a first index record corresponding to the location in the vector with the address of the first data record.

19. A system for implementing a vector of persistent objects, comprising:
(i) a processor;
(ii) a computer readable medium accessible to the processor; and
(iii) a program logic including code capable of causing the processor to perform:
(i) providing a constructor for a class of the vector of persistent objects;
(ii) in response to receiving a call to the constructor from an application executing within a runtime environment, performing:
(a) processing the constructor; and
(b) creating an empty vector of persistent objects; and
(iv) including a persistent object into the vector of persistent objects within the runtime environment by:
(a) storing persistent data for the added persistent object into a data record, wherein the data record is stored within the computer readable medium; and
(b) storing an address of the data record at a corresponding index record, wherein the index record is stored within the computer readable medium.

20. The system of claim 19, further comprising:
a data file stored within the computer readable medium, wherein the data file stores the data record; and
an index file within the computer readable medium wherein the index file stores the index record, and wherein the data file stores a plurality of data records, and wherein the index file stores a plurality of index records.

21. A computer readable medium including data structures for implementing an vector of persistent objects, comprising:
(i) a constructor for a class of the vector of persistent objects;
(ii) an empty vector of persistent objects, wherein in response to receiving a call to the constructor from an application executing within a runtime environment the constructor is processed and the empty vector of persistent objects created;
(iii) a data record, wherein a persistent object is included into the vector of persistent objects within the runtime environment by storing persistent data for the added persistent object into the data record; and
(iv) a corresponding index record, wherein the address of the data record is stored at the corresponding index record.

22. An article of manufacture including code for implementing a vector of persistent objects, wherein the code is capable of causing operations comprising:
(i) providing a constructor for a class of the vector of persistent objects;

(ii) in response to receiving a call to the constructor from an application executing within a runtime environment, performing:
  (a) processing the constructor; and
  (b) creating an empty vector of persistent objects;
(iii) including a persistent object into the vector within the runtime environment;
(iv) in response to including the persistent object into the vector, storing persistent data for the added persistent object into a data record; and
(v) in response to including the persistent object into the vector, storing an address of the data record at a corresponding index record.

23. The article of manufacture of claim 22, wherein the class comprises an extension of a Java Vector class.

24. The article of manufacture of claim 22, wherein the persistent objects comprise an object oriented database and wherein the database is manipulated by method calls on the persistent objects, wherein the method calls retain the persistent objects in a persistent state.

25. The article of manufacture of claim 22, further comprising:
  storing the data record in a data file;
  storing the index record in an index file, wherein the data file stores a plurality of data records, and wherein the index file stores a plurality of index records.

26. The article of manufacture of claim 25, wherein the address of the data record is an offset into the data file, wherein the offset is calculated from a starting address of the data file.

27. The article of manufacture of claim 25, wherein the data file and the index file are stored within a single entity.

28. The article of manufacture of claim 25, further comprising:
  receiving a request for accessing one persistent object in the vector in the runtime environment;
  locating an index record corresponding to the requested one persistent object from within the index file;
  locating from the index record corresponding to the requested one persistent object, a corresponding address of the data record holding the persistent data of the requested one persistent object; and
  providing access to the persistent data of the requested one persistent object from the located index record.

29. The article of manufacture of claim 25, further comprising:
  receiving an instruction to add a new persistent object to the vector in the runtime environment;
  appending bytes to the index file to include a new address of the persistent data for the new persistent object;
  storing in the appended bytes to the index file the new address obtained by incrementing a last data record address; and
  appending the persistent data for the new persistent object to a new data record following the last data record in the data file.

30. The article of manufacture of claim 25, further comprising:
  receiving an instruction for removing one persistent object of the vector in the runtime environment;
  adjusting contents of the index file to delete a stored address for persistent data corresponding to the one persistent object to remove; and
  marking persistent data for the one persistent object to remove in the data file as not in use.

31. The article of manufacture of claim 25, further comprising:
  receiving an instruction to update a new object in the runtime environment;
  storing at a first address in the data file persistent data for the new object; and
  updating the index file to store the first address.

32. The article of manufacture of claim 25, further comprising:
  receiving an instruction to insert a new persistent object at a location in the away vector in the runtime environment;
  increasing a size of the index file;
  shifting contents in the index file for all objects indexed to indices higher than the index record corresponding to the location in the vector;
  storing persistent data of the new persistent object at a first data record; and
  updating a first index record corresponding to the location in the vector with the address of the first data record.

* * * * *